Jan. 22, 1957  F. A. HARRINGTON ET AL  2,778,930
INDICATOR LIGHT WITH SNAP-IN MOUNTING
Filed Jan. 19, 1956
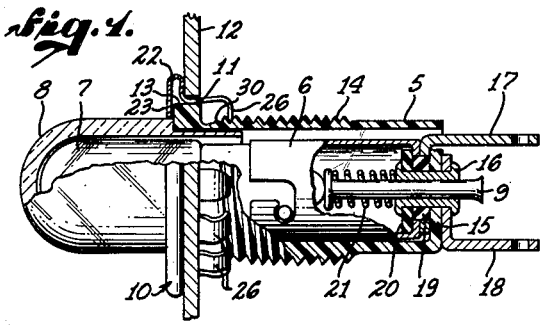
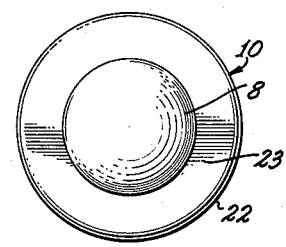
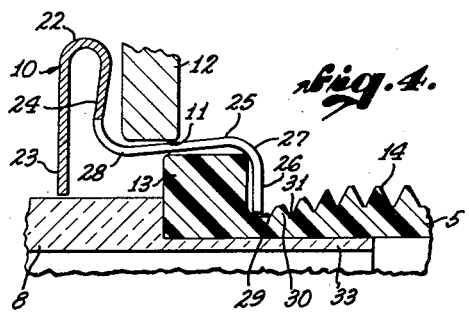
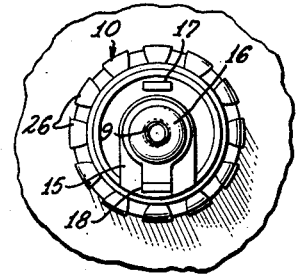
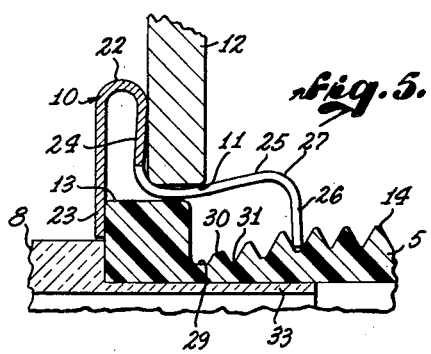
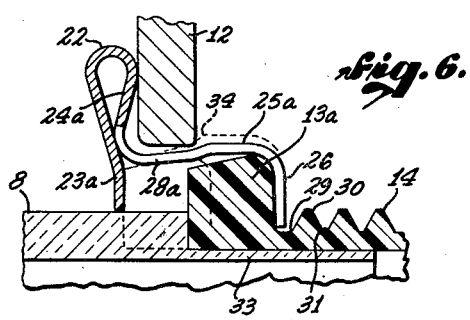
FRANK A. HARRINGTON &
WESTON W. BOWLES,
INVENTORS.
BY Lynn N. Latta
ATTORNEY.

United States Patent Office 2,778,930
Patented Jan. 22, 1957

2,778,930

INDICATOR LIGHT WITH SNAP-IN MOUNTING

Frank A. Harrington, Brea, and Weston W. Bowles, Anaheim, Calif., assignors to Marco Industries Company, Anaheim, Calif., a corporation of California Application January 19, 1956, Serial No. 560,107

7 Claims. (Cl. 240—52)

This invention relates to indicator lights and has as its general object to provide an improved, simplified means for mounting an indicator lamp in a panel. In particular, the invention aims to provide an indicator light that can be installed quickly, avoiding the time-consuming operation of screwing a retainer nut onto the threaded barrel of an indicator light of the conventional type. More specifically, the invention contemplates an indicator lamp having a mounting fastener in the form of a grommet adapted to be installed with a snap-in action into a panel aperture and in encircling gripping relation to an indicator lamp barrel.

A further object is to provide such an indicator lamp wherein the mounting grommet is adapted to establish a jaw-clutching connection with external threads on the lamp barrel so as to securely grip the same.

Another object is to provide such an indicator lamp having on its barrel threads that are adapted to cooperate with the mounting grommet in a manner to tighten the engagement of the latter within the panel aperture upon rotating the barrel a few turns.

Other objects will become apparent in the ensuing specifications and appended drawing in which:

Fig. 1 is a side view, broken away and partially in section, of an indicator lamp embodying the invention;

Fig. 2 is a front end view thereof;

Fig. 3 is a rear end view thereof;

Figs. 4 and 5 are enlarged fragmentary sectional views illustrating several stages in assembly of the indicator lamp in a panel; and Fig. 6 is an enlarged fragmentary sectional view of a modified form of the invention.

Referring now to the drawing in detail, I have shown, as an example of one form in which the invention may be embodied, an indicator lamp embodying generally a barrel 5, a socket 6, a lamp 7 mounted in socket 6, a lens 8, a central contact pin 9, and a grommet 10 for mounting the lamp in an aperture 11 in a panel 12.

Barrel 5, of insulating material, has at its outer end a flange 13 projecting radially outwardly and adapted to fit within aperture 11 with radial clearance providing an annular space sufficient to freely receive the thickness of the sheet metal of which grommet 10 is formed. Adjacent flange 13, barrel 5 has an external thread or threads 14. At its rear end, barrel 5 may have a tab 15 extending radially inwardly and provided with an aperture at the axis of the barrel. In such aperture there is mounted a bushing 16 which projects through, and supports, a sandwich assembly of parts including tab 15, radial arms of terminals 17 and 18, and insulator washers 19 and 20, insulating terminal 17 and socket 6 from bushing 16. Bushing 16, of metal, establishes a conductive connection between contact pin 9 and terminal 18. A coil spring 21, encircling pin 9, engages the head of the latter under compression, to press it into yielding contact with center contact of lamp bulb 7. The lateral contact of bulb 7 is connected through socket 6 to terminal 17. Such an indicator light contact assembly is old, and forms no part of the present invention.

Grommet 10 comprises a circumferentially continuous collar portion 22 of U-section including a flat flange 23 projecting radially inwardly on one side thereof, beyond the inner margin of a web portion 24 constituting the other side thereof. From web portion 24, a plurality of circumferentially separated integral fingers 25 project axially, terminating in radially inwardly extending claws 26, with curved shoulders 27 joining claws 26 to fingers 25. Fingers 25 flare outwardly in conical array from their concave root portions 28 to shoulders 27, which have a maximum radius from the grommet axis that is slightly larger than the radius of opening 11. Thus fingers 25 present an interference fit in opening 11 when forced therethrough, but are adapted to yield inwardly (grommet 10 being of spring metal) to permit passage of the grommet into the opening.

On barrel 5, an annular groove 29 is defined between end flange 13 and the thread 14, the groove 29 being adapted to receive the claws 26 and allow them to contract sufficiently to accommodate the inward contraction of fingers 25 as the latter are forced through opening 11, as indicated in Fig. 4. Thread 14 has a lead portion 30 of radially spiralling form (gradually increasing in radius, especially at its root), whereby the bottom of the groove 31 between adjacent turns of lead thread 30, as it follows the helical turns of the thread, constitutes a slowly rising conically spiralling cam. Annular groove 29 leads into the thread groove 31, and is adapted to guide the claws 26 into groove 31 when barrel 5 is rotated in the proper direction. Such rotation, executed while holding web 24 of grommet 10 against panel 12, will cause the barrel 5 to advance (from the starting position of Fig. 4) into the grommet until end flange 13 seats against flange 23 (Fig. 5) while the claws, following the rising thread groove 31, will be spread so as to jam the fingers 25 tightly against the wall of opening 11, with the outer portions bowed outwardly beyond the diameter of the opening sufficiently to securely lock the grommet to the panel 12. At the same time, the grommet, with its flange 23 tightly drawn against end flange 13 of the barrel to block endwise movement of the barrel in one direction, and with the claws 26 tightly engaged against thread 14 to block endwise movement of the barrel in the opposite direction, the barrel will be securely and tightly locked to the grommet, and thus to the panel 12 so that it cannot move or rattle in its mounting. When the barrel has been rotated sufficiently to draw grommet flange 23 snugly against barrel flange 13, a further final twist may be given to the barrel, to spring claws 26 away from flange 13 so that they are tilted to a splayed condition as indicated in Fig. 5. Thus placed under tension, claws 26 will exert axial pressure against barrel 5 to maintain it securely seated against flange 23. Such axial loading will also assist the inward pressure of the claws 26 against the bottom of thread groove 31 to lock the grommet and barrel to one another in a manner to resist unthreading movement in the presence of vibration.

In assembling the parts, the fingers 25 can be flexed outwardly to spread the claws 26 sufficiently to pass them over flange 13 of the barrel. Installation of the indicator lamp in panel 12 is then effected by adjusting claws 26 into groove 29, then inserting the light, terminal end first, through the opening 11, and pressing the rounded shoulders 27 of fingers 25 against the edge of the opening. Sufficient pressure is applied to effect a camming action of shoulders 27 against the edge of the opening, causing fingers 25 to flex inwardly until the grommet snaps into the opening. The barrel is then rotated to lock the grommet tightly in the panel as hereinbefore described.

Lens 8 projects forwardly from grommet 10 to a sufficient length, and is coupled to barrel 5 sufficiently tightly (as by snug frictional engagement of its reduced neck portion 33 within barrel 5) so that it may be used as a knob to rotate the barrel.

During the operation of rotating the barrel 5 to effect the threading action between the barrel and the grommet, the latter will frictionally grip the inner wall of opening 11 so as to be restrained from rotating with the barrel. Such frictional gripping is derived from the outward springing of the fingers 25, exerting resilient pressure against the opening wall.

Fig. 6 discloses a modified form of the invention wherein the thread 14 is a plain thread throughout its length, with uniform root diameter, and wherein fingers 25a are provided with offset shoulders 34 and with root portions 28a which are flared outwardly from the web portion 24 of the grommet 10a to provide a camming action between such root portions 28a and a conical camming face 35 on the periphery of barrel flange 13a, resulting from the action of thread 14 in drawing the grommet rearwardly so as to draw the web portion 24a against the flange 13a. The camming action is such as to spread the fingers 25, thereby causing shoulders 34 to lock against panel 12 as the flange 13a engages flange 23a. Thus, the grommet is locked to the panel and to the barrel 5 as the result of the threading action of the thread 14 against the claws 26, although the claws 26 remain at the same radial distance from the axis of the indicator light.

In each form of the invention, there is provided an arrangement wherein an indicator light with a mounting grommet assembled thereto, may be inserted through a panel aperture, and, by applying axial pressure thereto, inserted through the aperture with the spring fingers of the grommet yielding so as to snap through the aperture and to loosely secure the indicator light to the panel. Thereupon, by rotating the indicator light, while the grommet remains in a non-rotating position by frictional engagement with the panel, the grommet is locked tightly to the panel so that the indicator light is securely supported against vibration, rattling or other movement relative to the panel.

We claim:

1. In an indicator light for installation in an opening in a mounting panel: a barrel having a forward end provided with a radially outwardly projecting flange and an external thread defining a groove beginning adjacent said flange; and a grommet of spring sheet material including a collar portion of U-section having a forward portion terminating in a flange projecting radially inwardly, and having a rear web portion and a plurality of spring fingers integrally joined to said rear web portion and projecting axially therefrom, said fingers terminating in claws projecting radially inwardly and received in said groove, said fingers having curved shoulder portions joining them to said claws, said shoulder portions having normal maximum diameter slightly larger than said panel opening, and being adapted to flex said fingers inwardly in response to axial pressure against the grommet, whereby to snap the grommet through said opening, said claws being cooperable with said thread, in response to rotation of the barrel relative to the grommet, to effect a threading action by which said barrel is drawn into the grommet until said barrel flange seats against said grommet flange and said collar seats against said panel, whereby to secure the barrel to the grommet and the grommet to the panel.

2. In an indicator light for installation in an opening in a mounting panel: a barrel having a radially outwardly projecting flange and a thread defining a groove beginning adjacent said flange and extending helically rearwardly therefrom; a lens attached to said barrel forwardly of said flange; and a grommet including a collar portion encircling said barrel forwardly of said flange and a plurality of circumferentially separated spring fingers projecting axially rearwardly from said collar, said collar having a flange projecting radially inwardly in overlapping relation to said barrel flange, forwardly thereof, and said fingers having, at their rear ends, claws extending radially inwardly and engaged in said groove, said fingers having curved shoulder portions joining them to said claws, said shoulder portions having normal maximum diameter slightly larger than said panel opening, and being adapted to flex said fingers inwardly in response to axial pressure against the grommet, whereby to snap the grommet through said opening, said claws being cooperable with said thread, in response to rotation of the barrel relative to the grommet, to effect a threading action by which said barrel is drawn into the grommet until said barrel flange seats against said grommet flange and said collar seats against said panel, whereby to secure the barrel to the grommet and the grommet to the panel.

3. An indicator light as defined in claim 2, wherein said thread has a lead portion the root diameter of which rises in a conically spiralling configuration beginning adjacent said barrel flange and extending rearwardly, for spreading said claws to expand the grommet fingers in the panel opening and thereby tightly lock the grommet to the panel.

4. An indicator light as defined in claim 2, wherein said grommet fingers have root portions flaring outwardly at the juncture with said collar, from minimum diameter less than the opening diameter, to a diameter larger than said opening diameter immediately adjacent the collar, whereby, upon drawing the collar against the panel, said root portions will exert a wedging action in the panel opening to tightly lock the grommet to the panel.

5. In an indicator light for installation in an opening in a mounting panel: a barrel having a radially outwardly projecting flange and a thread defining a groove beginning adjacent said flange and extending helically rearwardly therefrom; a lens attached to said barrel forwardly of said flange; and a grommet including a collar portion encircling said barrel forwardly of said flange and a plurality of circumferentially separated spring fingers projecting axially rearwardly from said collar, said collar having a flange projecting radially inwardly in overlapping relation to said barrel flange, forwardly thereof, and said fingers having, at their rear ends, claws extending radially inwardly and engaged in said groove, said claws being cooperable with said thread, in response to rotation of the barrel relative to the grommet, to effect a threading action by which said barrel is drawn into the grommet until said barrel flange seats against said grommet flange and said collar seats against said panel, whereby to secure the barrel to the grommet and the grommet to the panel.

6. In an indicator light for installation in an opening in a mounting panel: a barrel having a radially outwardly projecting flange and a thread defining a groove beginning adjacent said flange and extending helically rearwardly therefrom; a lens attached to said barrel forwardly of said flange; and a grommet including a collar portion encircling said barrel forwardly of said flange and a plurality of circumferentially separated spring fingers projecting axially rearwardly from said collar, said collar having a flange projecting radially inwardly in overlapping relation to said barrel flange, forwardly thereof, and said fingers having, at their rear ends, claws extending radially inwardly and engaged in said groove, said fingers collectively having a diameter such that they can be passed through the panel opening to install the light in the panel, said thread including a lead portion the root diameter of which rises in a conically spiralling configuration beginning adjacent said barrel flange and extending rearwardly, said thread being cooperable with said claws, upon rotation of the barrel relative to the grommet, to advance the barrel into the grommet to seat its end flange against the grommet flange and simultaneously to spread the claws radially outwardly to flex said fingers into gripping engagement with the wall of said opening.

7. An indicator light as defined in claim 6, wherein said grommet has a sufficiently snug fit in said opening, before said spreading of the claws, to retain the grommet against rotating with the barrel.

References Cited in the file of this patent

UNITED STATES PATENTS

| | | |
|---|---|---|
| 541,203 | Hall | June 18, 1895 |
| 1,755,590 | Carr | Apr. 22, 1930 |
| 1,778,186 | Douglas | Oct. 14, 1930 |
| 2,169,964 | Murphy | Aug. 15, 1939 |
| 2,219,327 | Miller | Oct. 29, 1940 |
| 2,331,254 | West | Oct. 5, 1943 |
| 2,444,779 | Krasberg | July 6, 1948 |
| 2,700,751 | Hallerberg | Jan. 25, 1955 |